United States Patent Office 2,959,627
Patented Nov. 8, 1960

2,959,627
PURIFICATION OF OLEFINS

Harold W. Fleming and William R. Gutmann, Louisville, Ky., assignors to Catalysts and Chemicals Inc., Louisville, Ky., a corporation of Delaware No Drawing. Filed Oct. 13, 1958, Ser. No. 766,713

7 Claims. (Cl. 260—677)

This invention concerns an improved method for purifying olefins which are contaminated with highly unsaturated compounds and compounds of sulfur. More specifically, this invention is concerned with the sequential conversion of acetylenic and diolefinic compounds in gas mixtures containing propylene and butylene followed by conversion of organic sulfur compounds in the treated gas mixtures.

One of the usual methods for manufacturing olefins comprises passing mixtures such as refinery gas, kerosene or gas oil through a reactor heated sufficiently to decompose such materials with the formation of hydrogen and one or more unsaturated compounds. Pyrolyses of this type have been carried out at temperatures ranging from about 500° C. to about 1200° C. with the yield of olefinic products per pass-through the reactor being highest at temperatures above 600° C. The olefin-containing mixtures obtained in such processes usually contain a variety of hydrocarbons with the olefins and separation of the latter in a form suitable for use such as in the production of high polymeric plastics has proven difficult. For instance, cracked butanes, cracked oil gas or refinery gas, all of which are well known sources of olefins usually contain paraffinic hydrocarbons ranging from methane to hexane, olefins such as ethylene, propylene, butylene, amylene and hexenes, diolefins such as propadiene, 1–3 butadiene, 1–2 butadiene, isoprene, piperylene and a small but appreciable amount of acetylenic hydrocarbons such as acetylene, methyl acetylene, ethyl acetylene and vinyl acetylene. The yield of acetylenic by-products becomes appreciable when operating at pyrolysis temperatures above 600° C., i.e. within the temperature range at which the olefins are usually produced in maximum yield. Within this temperature range the most stable sulfur compounds are hydrogen sulfide and carbonyl sulfide which are usually found in a ratio of about 10 to 1. The former compound is not of serious consequence since it can be easily removed by treatment with caustic or amine solutions. However, carbonyl sulfide is difficult to remove by conventional scrubbing procedures and must be converted to hydrogen sulfide to effect satisfactory removal thereof.

The demand for high polymeric plastics has increased greatly since World War II and more especially since 1950. For example, poly propylene is now in commercial production both in the United States and abroad and possesses properties which make its application superior in many instances to polyethylene. This material has created a demand for propylene of extreme purity containing acetylene in concentrations of less than 50 p.p.m. and in some instances less than 10 p.p.m. The problem of removal of carbonyl sulfide was not serious in the purification of ethylene for the production of polyethylene since the carbonyl sulfide was removed with the $C_3$ fraction in the ethylene concentration procedure. Both carbonyl sulfide and propylene have a boiling point of about −50° C. which renders removal by fractionation essentially impossible. Thus propylene separated from pyrolysis mixtures by conventional procedures will contain high percentages of carbonyl sulfide which must be reduced to a concentration of about 10 p.p.m. to be suitable for use in the production of plastics. Further the acetylene concentration of purified propylene must be also in the range of less than 50 p.p.m. in order to be suitable for such use.

An object of this invention is to provide a method of selectively removing highly unsaturated impurities and organic sulfur compounds from gas mixtures containing substantial quantities of $C_2$ and higher olefins.

More specifically, an object of this invention is to provide an efficient method for sequential hydrogenation of highly unsaturated impurities and conversion of organic sulfur compounds in said gas mixtures, without appreciable destruction of the desired olefins in either operation. Aside from the acetylenes the highly unsaturated hydrocarbon impurities are in most instances alpha beta unsaturated aliphatic hydrocarbons having no hydrogen atom on the beta carbon atom. This is to say, they are alpha beta diolefins or 1–2 diolefins. For convenience, such impurities are referred to herein as highly unsaturated hydrocarbon impurities. Other important objects will be apparent from the following detailed description of our invention.

We have discovered that conversion of COS can not be satisfactorily effected in the presence of substantial quantities of highly unsaturated compounds. In other words, the highly unsaturated compounds tend to poison the organic sulfur conversion catalyst. However, the organic sulfur compounds do not appreciably affect the efficiency of the selective hydrogenation catalyst for the hydrogenation of acetylenes and alpha beta diolefins. We have found further that due to this peculiar poisoning effect both classes of impurities can not be satisfactorily hydrogenated in one bed of catalyst unless the conditions are so severe as to destroy a major portion of the olefins. Therefore, according to this invention, the gas mixture is treated over a selective hydrogenation catalyst which is active for the hydrogenation of the highly unsaturated impurities and then over an organic sulfur conversion catalyst to selectively convert the carbonyl sulfide to hydrogen sulfide without substantial destruction of the olefins in either stage.

The selective hydrogenation catalysts comprise the sulfides of the group 6 and group 8 metals, as for example, nickel sulfide, cobalt sulfide, molybdenum sulfide or compounds of metals of these groups as, for example, cobalt molybdate. The catalysts are preferably supported on rugged carriers. Organic sulfur conversion catalyst may comprise the oxides or sulfides of iron or copper separately or in admixture with the oxides of the metals of the left hand side of the 6th group of the periodic table. With large concentrations of steam these latter oxides, as for example chromium oxide, may be utilized without an oxide of iron and copper; however, the catalysts containing iron or copper are much more efficient. A preferred organic sulfur conversion catalyst consists of the oxides of chromium and copper on activated alumina.

The invention will be better understood by reference to the following examples.

Example 1

A catalyst containing on a final basis 6.8% copper oxide and 8% chromic oxide on activated alumina was prepared by dipping calcined alumina tablets in an aqueous solution of copper nitrate and chromic acid. After drying and calcination, 25 cc. of these tablets were loaded into an isothermal reactor which comprised an iron pipe with catalyst support grids, jacketed with a Dowtherm jacket.

A gas mixture of the following composition

| | |
|---|---|
| $C_3H_6$ | 17.0 |
| $C_2H_4$ | 65.8 |
| $H_2$ | 11.5 |
| $CH_4$ | 5.4 |
| $H_2O$ | 0.1 |
| COS | p.p.m. 1322 |
| $C_2H_2$ | p.p.m. 4420 | was passed through the reactor at a temperature of 500° F. and a pressure of 175 p.s.i.g. On the first day the acetylene was removed to about 94 p.p.m. and there was no leakage of COS at a space velocity of 1000. Space velocity is defined as the volumes of gas passed over a volume of catalyst per hour under normal temperature and pressure. At the end of five days the acetylene leakage was 463 p.p.m. and the COS leakage was 92. When the space velocity was increased to 2000 the COS leakage increased to 245 p.p.m. There was no loss of either ethylene or propylene throughout the run. The catalyst when removed from the reactor was found to be heavily coked. Sulfur determinations were made by the method of Hinsvark et al. as reported in Analytical Chemistry 29, 1318–22 (1957).

*Example 2*

The same catalyst was tested with essentially the same gas mixture except that no acetylene was present in the gas. At a temperature in the range of from 490 to 550° F. and at a space velocity varying from 800 to 2000 there was no leakage of COS during a five day run.

It will be noted that this catalyst was inactive for the hydrogenation of acetylene and in the presence of 4000 parts per million of acetylene progressively lost activity for the conversion of COS. We have found that with gas streams containing less than about 500 parts per million of acetylene that the poisoning effect of the acetylenes is much less pronounced and that the catalyst can be regenerated by the addition of from 10 to 20% steam to the process gas. At an acetylene concentration of about 100 p.p.m. the poisoning effect is negligible.

*Example 3*

A catalyst containing on a final basis 3.3% cobalt sulfide and 0.07 chrome (both expressed as metals) was prepared by forming a solution of cobalt nitrate and chromic acid of about 8.5% metal concentration in water. Sufficient sulfuric acid was added to convert the salts to metal sulfates and a commercial refractory was immersed in said solution and calcined at 800° F. for 12 hours. 25 cc. of this catalyst was charged to the reactor described in Example 1 and was pretreated by passing hydrogen therethrough at a temperature of 750° F. for 3 hours. Thereafter a gas mixture of essentially the same composition as that of Example 1, except containing 2.5% methyl acetylene instead of 0.44 acetylene, was passed over the catalyst at a temperature of 500, a pressure of 240 p.s.i.g. and a space velocity of 800. Analysis of the effluent indicated negligible conversion of COS and olefins. The methyl acetylene concentration was found to be 35 p.p.m. or over a 99.8% conversion.

*Example 4*

A catalyst containing 2.9% nickel, 0.53 cobalt and 0.07% chromium (as metals) was prepared in the same manner as that of Example 3 and tested under identical conditions. The effluent gas contained about 35 p.p.m. of methyl acetylene. There was negligible conversion of COS and about a 2.5% loss of ethylene.

*Example 5*

A commercial catalyst containing 20% cobalt molybdate on a low surface area support was tested with the gas composition of Example 3 at a temperature of 500° F., a pressure of 175 p.s.i.g. and a space velocity of 1000. Organic sulfur conversion was negligible but the acetylene conversion was over 99% with an outlet of about 100 p.p.m. Less than 3% ethylene was hydrogenated.

It will be noted that all of the catalyst of Examples 3, 4 and 5 were selective as to the mono olefins and active as to the acetylenes. However, conversion of organic sulfur was negligible in each instance.

*Example 6*

A catalyst containing 15% chromium oxide on activated alumina was tested under the same gas composition as that of Example 2 except that 20% steam was added. At a temperature of 630° F. and a space velocity of 400 the COS was reduced to a level of 10 to 12 p.p.m. without destruction of the olefins.

*Example 7*

An iron oxide-chromium oxide (85% $Fe_2O_3$, 15% $Cr_2O_3$) catalyst (prepared by adding caustic to a solution of iron sulfate and sodium bichromate) was tested under the conditions of Example 2. At a space velocity ranging from 1000 to 8000 and a temperature ranging from 490° to 550° F. the COS in the effluent was between 3 and 5 p.p.m. No loss of olefins was noticed.

It will be apparent that there has been disclosed a new and novel combination process for the removal of impurities from olefinic gas streams. This new process purifies gas composition containing a desired aliphatic mono-olefin having from 2 to 5 carbon atoms and a minor proportion of highly unsaturated hydrocarbon impurity and carbonyl sulfide. This gas composition is passed with hydrogen over a catalyst such as nickel sulfide, cobalt sulfide and cobalt molybdate at a temperature of about 300° F. to about 600° F., a space velocity of from 500 to 3000 and a pressure from 3 to 40 atmospheres. The highly unsaturated impurities are hydrogenated to a level of from 5 to 500 parts per million without hydrogenating the mono-olefins. The product gas is then passed with hydrogen over a carbonyl sulfide conversion catalyst, e.g., the oxides and sulfides of copper, iron or chromium at a temperature of about 400° F. to 650° F., a space velocity of 500 to 4000 and a pressure from 3 to 40 atmospheres. Many modifications will become apparent to those skilled in the art and no limitations should be imposed except those in the appended claims.

We claim:

1. In a process for the purification of a gas containing as the principal desired constituent an aliphatic monoölefin having from two to five carbons and containing as a contaminant a minor proportion of highly unsaturated hydrocarbon impurities and carbonyl sulfide, the improvement which comprises the step of first passing the gas with hydrogen at a temperature in the range of from about 300 to about 600° F., a space velocity in the range of about 500 to about 3000 and a pressure in the range of about 3 to 40 atmospheres over a selective hydrogenation catalyst selected from the class consisting of nickel sulfide, cobalt sulfide and cobalt molybdate to selectively hydrogenate said highly unsaturated impurities, without appreciable hydrogenation of said monoölefins, and thereafter passing said gas with hydrogen at a temperature in the range of from about 400° F. to about 650° F., a space velocity of about 500 to about 4000 and a pressure in the range of about 3 to about 40 atmospheres over a carbonyl sulfide conversion catalyst selected from the class consisting of the oxides and sulfides of copper, iron and chromium to selectively convert said carbonyl sulfide without appreciable conversion of said monoölefins.

2. The process of claim 1 in which the selective hydrogenation catalyst is supported on a durable inert carrier and the concentration of the group VIII metal constituent of the catalyst, expressed as the metal, is in the range of from 1 to 10% by weight.

3. The process of claim 1 in which the carbonyl sulfide conversion catalyst consists essentially of from about 5 to about 25% by weight of the combined oxides of copper and chromium on activated alumina.

4. The process of claim 1 in which the carbonyl sulfide conversion catalyst consists essentially of iron oxide in a concentration by weight of from 85 to 98% and chromium oxide in a concentration by weight of from 15 to 2%.

5. The process of claim 1 in which more than 5% and less than 20% steam is added to the initial gas composition.

6. The process of claim 1 in which the olefinic constituent of the gas composition is composed primarily of propylene.

7. The process of claim 1 in which the hydrogen is present in the initial gas composition and in which no additional hydrogen is added during the process.

References Cited in the file of this patent

UNITED STATES PATENTS

| | | |
|---|---|---|
| 2,073,578 | Gwynn | Mar. 9, 1937 |
| 2,116,061 | Dorrer | May 3, 1938 |
| 2,298,347 | Corson et al. | Oct. 13, 1942 |
| 2,814,653 | Hogan et al. | Nov. 26, 1957 |